Dec. 12, 1933.   W. R. WICKERHAM   1,939,093
VARI-VOLTAGE CONTROL SYSTEM FOR MOVABLE BRIDGES
Filed April 12, 1932   2 Sheets-Sheet 1
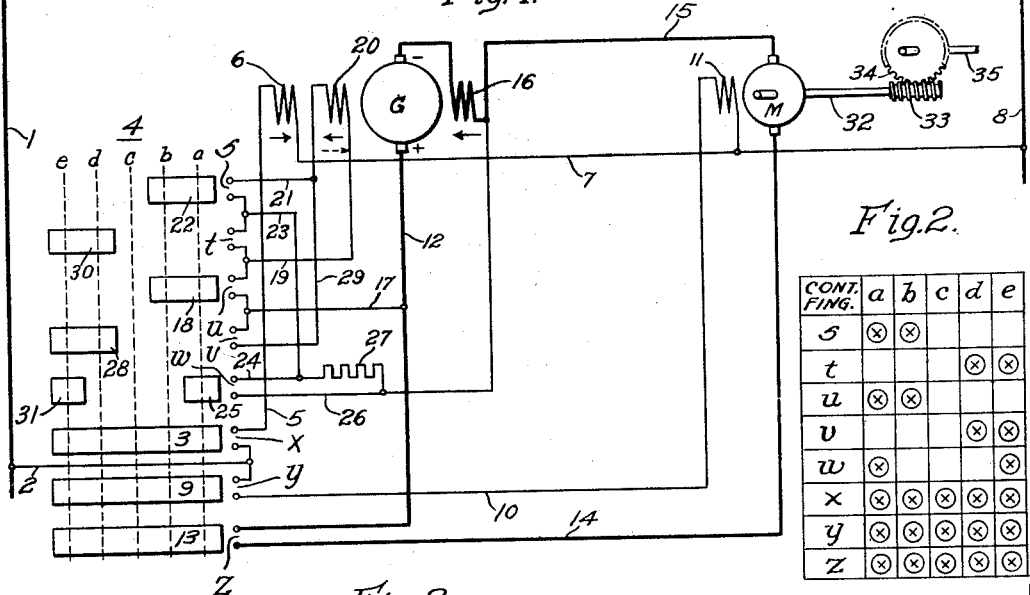
Fig. 1.
Fig. 2.
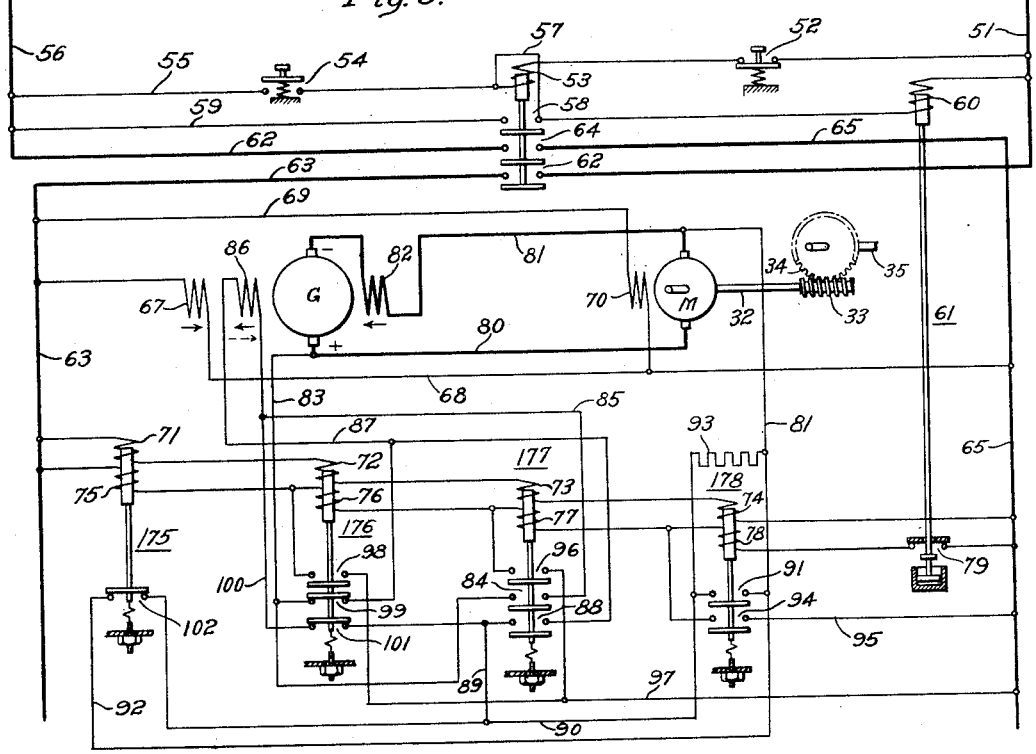
Fig. 3.
WITNESSES:
C. J. Weller.
Paul E. Friedemann
INVENTOR
William R. Wickerham.
BY
W. R. Coley
ATTORNEY

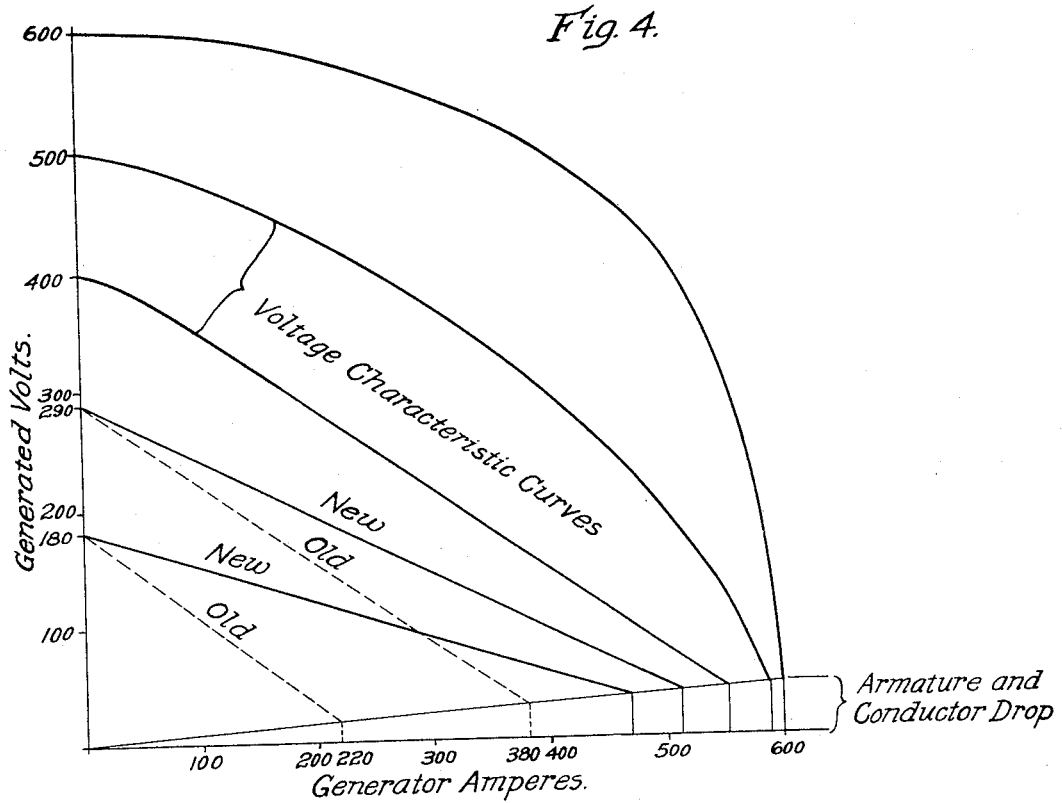
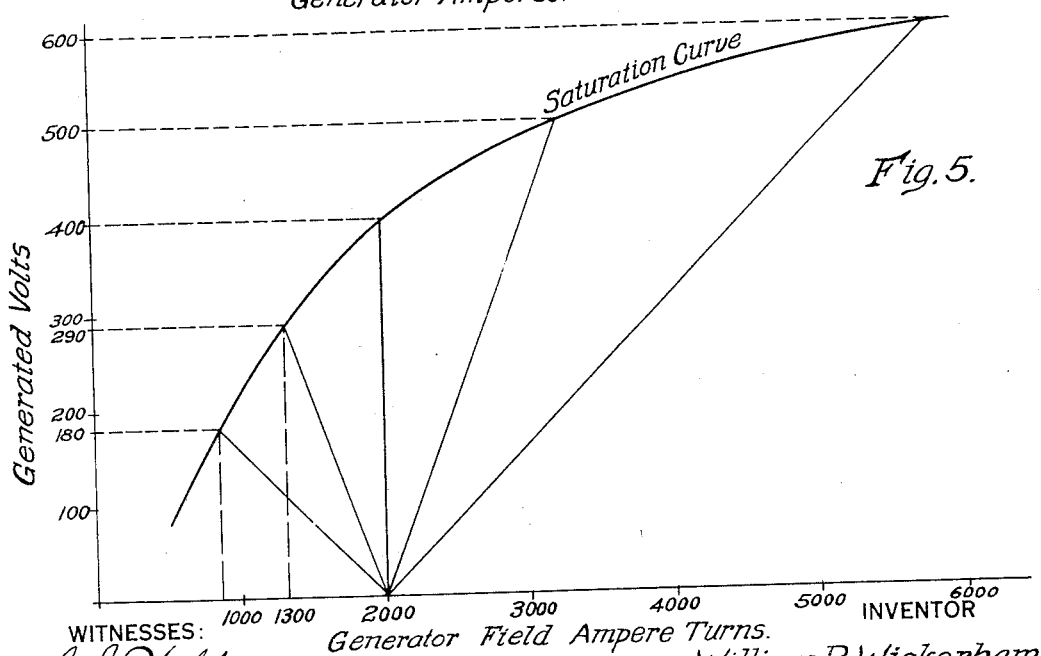

Patented Dec. 12, 1933

1,939,093

UNITED STATES PATENT OFFICE 1,939,093

VARI-VOLTAGE CONTROL SYSTEM FOR MOVABLE BRIDGES

William R. Wickerham, Wilkinsburg, Pa., assignor to Westinghouse Electric & Manufacturing Company, a corporation of Pennsylvania Application April 12, 1932. Serial No. 604,728

8 Claims. (Cl. 172—239)

This invention relates to control systems for electric motors.

More particularly this invention relates to a system of control whereby the voltage characteristic of a generator supplying a motor is changed to satisfy the required characteristics of operation of the load driven by the motor.

To fully understand the advantages and novel results of this invention, a brief description of the related prior art is helpful.

With the devices heretofore in use, a motor is directly connected to a generator having a plurality of field windings, namely, a series differential field, a separately excited field winding, and a cumulative shunt field winding.

A shunt or compound motor is directly connected to the main generator circuit. Since the speed of the shunt motor is approximately proportional to the generator terminal voltage, the motor speed and torque can be controlled by manipulations of the controller which operates on the plurality of field windings of the generator.

If it be assumed that a master controller having five contact positions is provided for the devices of the prior art, the field windings of the generator of a design assumed may be manipulated so as to give 900 ampere turns for the separately excited field, which results in about 180 terminal volts at no-load. See the broken line curves shown in Fig. 4 illustrating the voltage characteristic of the generator. Appearance of a load results in a decrease in terminal voltage due to the neutralizing effect of the differential ampere turns of the series field winding. A certain value of load will thus entirely neutralize the effect of the separately excited field winding and, on the example curves, this occurs at 220 load amperes. It will thus be noted that the voltage characteristic of the generator is a very drooping characteristic.

The second point of the controller is designed to increase the ampere turns of the separately excited winding to about 1300 ampere turns which increases the no-load voltage of the generator to about 290 volts, and, when load appears, the zero voltage occurs at about 380 load amperes. Fig. 4 shows the voltage characteristic of the generator for a second operating position of the master controller. The third contact position of a controller similarly increases the no-load voltage to about 400 volts and the zero voltage occurs at about 550 load amperes. Successive points of a controller have the effect of increasing the voltage at the lower load, but the zero voltage still occurs between 550 to 600 load amperes. This is explained by the fact that the self-excited shunt field winding usually has inherent resistance so high that the generator cannot build up or maintain voltage by its effect alone. Therefore, when the separately excited field is neutralized by the differential series field winding, the self-excited field also collapses.

It is an object of this invention to improve the operating characteristics of the system of control of the kind above outlined.

It is also an object of this invention to positively limit the maximum motor torque by the machine reactions without the use of relays and that abuse of the machinery cannot result through improper manipulation of the master controller.

It is a further object of this invention to change the voltage characteristic of a generator supplying a motor to increase the torque of a motor driving a load to approximately its maximum value without an increase in the no-load voltage of the generator.

A still further and more specific object of this invention is to provide a flatter voltage characteristic for a generator than has been heretofore secured, during the movement of a master controller from its off position to a plurality of succeeding operating positions; to permit the generator voltage characteristic to assume the form determined by the design of the generator for an intermediate position; and to progressively increase the drooping characteristic of the generator for a plurality of remaining master controller positions.

Other objects and advantages of this invention will become more apparent from a study of the following specification, when taken in conjunction with the accompanying drawings, wherein:

Figure 1 represents a diagrammatic showing of a control system embodying my invention, utilizing a manually operable master controller;

Fig. 2 is a sequence table showing the sequence of operation for the control system;

Fig. 3 represents a diagrammatic showing of my invention utilizing a plurality of time-controlled magnetic contactors, and Figs. 4 and 5 are curves illustrating the limitations of the devices of the prior art, as well as the advantages of this invention.

Referring more particularly to Fig. 1, M designates a shunt wound motor mechanically coupled to a shaft 32, a worm 33, a worm wheel 34, which, through a shaft 35, drives the load. In the particular installation had in mind when this invention was made, shaft 35 operates a bridge, which may either be of the vertically moving type, a bascule type bridge, or a bridge moving about a vertical axis. Since this control system is not limited to any particular load, the nature of the load connected to shaft 35, is immaterial.

The motor M may be directly connected to the generator G by means of a controller 4. The generator G has a separately excited field winding 6, a shunt field winding 20, and a series field winding 16.

To more completely understand the advantages and novel results attained by this invention, the sequence of operation of the various elements will be considered.

Assuming that buses 1 and 8 are suitably energized and that controller 4 is moved to position a, this operation of the controller establishes a circuit from bus 1, through conductor 2, contact fingers x bridged by the controller segment 3 of the controller 4, conductor 5, separately excited field winding 6, assumed to be acting in the direction indicated by the full line arrow, and conductor 7 to the bus 8. A second circuit is established from the energized conductor 2, contact fingers y bridged by the controller segment 9 of the controller 4, conductor 10 and separately excited field winding 11 for the motor M to the energized conductor 7.

If it be assumed that the lower terminal of the generator is the positive terminal, energy for the motor is transmitted from the generator, through conductor 12, contact fingers z bridged by controller segment 13 of controller 4, conductor 14, the armature of the motor M, conductor 15, differential series field winding 16, assumed to be acting in the direction indicated by the full line arrow adjacent this field winding, to the negative terminal of the generator G. A further energized circuit is established from the positively energized conductor 12, through conductor 17, contact fingers u bridged by controller segment 18 of controller 4, conductor 19, shunt field winding 20, assumed to be acting in the direction indicated by the full line arrow adjacent this field winding, conductor 21, contact fingers s bridged by controller segment 22 of the controller 4, conductors 23 and 24, contact fingers w bridged by controller segment 25 of the controller 4, conductor 26, series field winding 16 to the negative terminal of the generator G.

Since the self-excited field winding acts differentially with reference to the separately excited field winding and cumulatively with the series field winding 16, and further, since this shunt field winding is rather heavily excited because of the shunt circuit around the resistor 27 through controller segment 25, the voltage characteristic of the generator for the first position of the master controller is as shown in Fig. 4, namely, the voltage droops, but much less steeply than former devices, from a no-load voltage of 180 volts to a zero voltage at approximately 460 load amperes. Since the separately excited field winding is coupled to a source of voltage having a substantially constant value, and since its inherent characteristics do not change, the effective ampere turns remain a constant.

From the foregoing arrangement, it is obvious that the torque of the motor M is maintained at approximately a maximum value without an increase in no-load voltage. This will guarantee high torque and low speed, a highly desirable characteristic for "seating bridges" and a controlling speed during the final movement near the limits of travel.

Assume that the controller is moved to the position b. The only effect that this operation has is to open the circuit at contact fingers w and thus insert the resistor 27 in the circuit of the shunt field winding 20, thereby decreasing the differential effect of the shunt field winding. Fig. 4 shows that for such operation, the no-load voltage of the generator is approximately 290, whereas the zero voltage of the generator is at a load current of 510 amperes. Again it will be noted that the torque of the motor is approximately at its maximum value without a very substantial increase in no-load voltage, whereas the speed of the motor is still maintained at a low value.

Movement of the controller to the position c disconnects the shunt field winding 20 entirely from the generator by opening the circuit at the contact fingers u and s cooperating with the controller segments 18 and 22.

When the controller is moved to the position d, a circuit is established from the positively energized conductor 12, through conductor 17, contact fingers v bridged by controller segment 28, conductor 29, shunt field winding 20, now acting in the direction indicated by the broken line arrow adjacent the shunt field winding, conductor 19, contact fingers t bridged by controller segment 30, conductor 23, resistor 27, conductor 26, series field winding 16 to the negative terminal of the generator G. When the controller 4 is moved to the last position, namely, the position e, the resistor 27 is shunted from the circuit of the shunt field winding by the bridging of contact fingers w by controller segment 31, thereby increasing the cumulative effect of the shunt field winding. This successive change in the operating characteristics of the shunt field winding provides the generator with the plurality of voltage characteristics indirectly indicated by the curves shown in heavy lines in Fig. 4. It is thus obvious that for the higher no-load voltages, the speed of the motor will drop off very rapidly when there is an increase in the load current, such drooping characteristic of the generator again being a very desirable characteristic for the high speeds. Fig. 5 shows the no-load voltages for the successive positions of the controller.

The foregoing discussion is merely illustrative of the advantages of this invention, since it is obvious that a wider variety of voltage characteristic curves can be secured for the main generator G by merely increasing the number of controller positions and the number of resistor sections, such as resistor 27, that may be successively inserted in the shunt field winding during initial movements of the controller and then successively shunted for the final positions of the controller.

Fig. 3 shows a modification of this invention utilizing a plurality of magnetic contactors to accomplish the results desired. Assuming that the buses 51 and 56 are energized and it is desired to start the operation of the control scheme, starting push button switch 54 is actuated, thereby establishing a circuit from the positively energized conductor 51, through the stop switch 52, actuating coil 53 of the main contactor, starting switch 54 and conductor 55 to the bus 56. Operation of the main contactor provides a holding circuit for coil 53 through conductor 57, contact members 58 and conductor 59 to the bus 56. With the closing of the contact members 58, actuating coil 60 of the time-limit contactor 61 is energized.

As herein shown, the time-limit contactor 61 is provided with a dash-pot which becomes ineffective after the contactor has moved through a predetermined distance and then with a snap action opens the contact members 79. The time-limit device 61 may take any form which will provide the necessary time constant and need not be of the kind herein shown.

Closing of the contact members 62 and 64 energizes the secondary buses 63 and 65, thus establishing a circuit from the positively energized conductor 63, through separately excited field winding 67, assumed to be acting in the direction indicated by the full line arrow adjacent the field winding 67, and conductor 68 to the bus 65. A second circuit is established from bus 63 through conductor 69, separately excited field winding 70, for the motor M to the energized conductor 68.

Since the contact members 79 of the time-limit contactor 61 do not immediately open, the magnetizing coils 75, 76, 77 and 78 of the time-limit contactors 175, 176, 177 and 178 are energized, and these time-limit contactors immediately operate to close or open, as the case may be, their respective contact members. The time-limit contactors 175, 176, 177 and 178 are provided with neutralizing coils 71, 72, 73 and 74, respectively. These neutralizing coils merely neutralize the residual magnetism of the contactors when the magnetizing coils are deenergized, and in conjunction with the adjustable spring mechanisms shown, definitely fix the time constant of the time-limit devices. Again it should be noted that I do not wish to be limited to the particular time-limit devices herein shown, because it is obvious that a clock mechanism or a synchronous motor device may be utilized to accomplish equally effectively the results hereinafter specified. Since the generator G is assumed to be operating, the motor armature is energized from the positive terminal of the generator through conductor 80, the armature of the motor M, conductor 81, differential series field winding 82, acting in the direction indicated by the full line arrow adjacent differential field winding, to the negative terminal of the generator G.

Operation of the time-limit contactors 177 and 178 establishes a circuit from the positive terminal of the generator G through conductor 83, contact members 84, conductor 85, shunt field winding 86, acting differentially with reference to the field winding 67 as indicated, conductor 87, contact members 88, conductors 89 and 90, contact members 91, conductor 81, differential series field winding 82 to the negative terminal of the generator G.

After the desired time, contact members 79 are opened, thereby deenergizing the magnetizing coil 78 of the time-limit relay 178. A predetermined interval of time after the deenergization of the coil 78, the contact members 91 and 94 open. Opening of the contact members 91 inserts the resistor 93 in the circuit of the shunt field winding, thereby decreasing its differential effect, whereas opening of the contact members 94 deenergizes the magnetizing coil 77 of the time-limit device 177.

After the lapse of a second predetermined interval of time, the contact members 96, 84 and 88 open, thus deenergizing the field winding 86 and also deenergizing the magnetizing coil 76 of the time-limit relay 176. A third predetermined interval of time after the opening of contact members 96, the contact members 99 and 101 close, thereby establishing a circuit from the energized conductor 83, through contact members 99, conductor 87, shunt field winding 86, now acting cumulatively as indicated with reference to the field winding 67, conductor 100, contact members 101, conductors 89 and 90, resistor 93, to the negatively energized conductor 81.

Since the contact members 98 are opened by the operation of time-limit contactor 176 the coil 75 of the time-limit contactor 175 is deenergized, the contact members 102 will thus close a predetermined interval of time thereafter. When these contact members close, a shunt circuit for the resistor 93 similar to the shunt circuit through contact members 91 is established therefor, thus increasing the cumulative effect of the shunt field winding 86.

From the foregoing discussion, it is obvious that the novel results and advantages of my invention may just as readily be accomplished by the system of control shown in Fig. 3 as by the system of control shown in Fig. 1. Furthermore, the number of steps need not be limited to five at all, but the resistance value and the number of sections of resistor 93 may be increased and the number of time-limit devices required to accomplish a specified result may be increased.

It is, of course, understood that the foregoing discussion clearly disclosing two modifications of my invention is merely illustrative thereof and that other circuit arrangements may be devised to accomplish the desired result and that I do not wish to be limited to the particular arrangement shown, nor the particular voltage values and load ampere values discussed, but that limitations shall be imposed upon this invention only as indicated in the appended claims.

I claim as my invention:

1. In a system of control, a generator, said generator having a separately excited field winding, a series field winding acting differentially to the separately excited field winding, and a shunt field winding, means for gradually varying the effect of the shunt field winding from a strong differential effect through zero to a strong cumulative effect, and a motor connected to the generator.

2. In a system of control, a generator, said generator having a plurality of field windings, control devices for changing the operating characteristics of one of the field windings to gradually vary the voltage characteristic of the generator from a characteristic drooping a relatively small amount to a more drooping characteristic by successive operations of the control devices, and a motor connected to the generator.

3. In a system of control, a generator, said generator having a separately excited field winding, a series field winding acting differentially with reference to the separately excited field winding, and a shunt field winding connected differentially with reference to the separately excited field winding, a motor, resistors disposed to be connected in circuit relation with the shunt field winding, control means for connecting the motor in closed circuit relation with the generator and for simultaneously connecting the shunt field winding directly to the generator, means for successively connecting said resistors in circuit relation with the shunt field winding to decrease the differential effect thereof, means for disconnecting the shunt field winding from the generator, control means for reversing the connections of the shunt field winding with all the resistors in circuit relation therewith, and means for successively shunting the resistors.

4. In a system of control, a generator, a motor connected to the generator, a differential series field winding for the generator, a separately excited field winding for the generator and a shunt field winding, and means for varying the excitation of the shunt field winding from a given energization in one direction to a given energization in another direction.

5. In a system of control for a generator, in combination, a generator, an armature therefor, a main field winding energized a given amount to produce a substantially constant effect on the generator, a second field winding energized in proportion to the generator armature current and disposed to oppose the effect of the main field winding, a third field winding, and control means, having a plurality of successive operating positions, for changing the effect of said third field winding from a given differential effect with reference to the main field winding to a given cumulative effect with reference to the main field winding as said control means takes different operating positions.

6. In a system of control, a generator, a motor connected to the generator and designed to have a speed characteristic substantially proportional to the voltage of the generator, a plurality of field windings for the generator, and control devices for controlling the magnitude and relative magnetizing effect of said field windings, said control devices including means for successively changing the voltage characteristic of the generator from a characteristic drooping but a relatively small amount for certain operating positions of said control devices to a characteristic that is more drooping for certain other operating positions of said control devices.

7. In a system of control for a generator, in combination, a generator, a field winding, a control field winding and a series field winding disposed to act differentially with reference to the first-named field winding, and means for gradually varying the effect of the control field winding from a given differential effect through zero to a given cumulative effect.

8. In a system of control for a generator, in combination, a generator, an armature therefor, a pair of field windings, means for energizing one of said windings a substantially constant amount, means for energizing the second field winding, differential to the constant amount, by amounts varying with the current in the armature, and control devices including control means adapted to take a plurality of operating positions and energizing means for the generator for varying the relative effect of said field windings to vary the voltage characteristic of the generator from a characteristic drooping a relatively small amount to a more drooping characteristic as said control means takes successive operating positions.

WILLIAM R. WICKERHAM.